US007511090B2

(12) United States Patent
Wiese et al.

(10) Patent No.: US 7,511,090 B2
(45) Date of Patent: Mar. 31, 2009

(54) METHOD FOR IMPROVING THE STORAGE STABILITY OF COMPOSITE PARTICLE DISPERSIONS

(75) Inventors: Harm Wiese, Heidelberg (DE); Joerg Leuninger, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 252 days.

(21) Appl. No.: 10/587,973

(22) PCT Filed: Feb. 24, 2005

(86) PCT No.: PCT/EP2005/001913

§ 371 (c)(1),
(2), (4) Date: Aug. 3, 2006

(87) PCT Pub. No.: WO2005/083015

PCT Pub. Date: Sep. 9, 2005

(65) Prior Publication Data

US 2007/0161740 A1      Jul. 12, 2007

(30) Foreign Application Priority Data

Feb. 27, 2004    (DE) .................. 10 2004 010 155

(51) Int. Cl.
*C04B 24/22* (2006.01)
(52) U.S. Cl. .................. 524/247; 524/248; 524/249; 524/250

(58) Field of Classification Search .................. 524/247, 524/248, 249, 250
See application file for complete search history.

(56) References Cited

U.S. PATENT DOCUMENTS

| 3,544,500 | A |   | 12/1970 | Desmond et al. |         |
|-----------|---|---|---------|----------------|---------|
| 3,673,137 | A | * | 6/1972  | Palluel        | 524/249 |
| 4,243,762 | A | * | 1/1981  | McClain        | 524/247 |
| 4,269,749 | A |   | 5/1981  | Marriott       |         |
| 4,421,660 | A |   | 12/1983 | Solc Nee Hajna |         |
| 4,608,401 | A |   | 8/1986  | Martin         |         |
| 4,771,086 | A | * | 9/1988  | Martin         | 523/205 |
| 4,981,882 | A |   | 1/1991  | Smith et al.   |         |
| 5,279,664 | A |   | 1/1994  | Robinson et al.|         |
| 6,387,997 | B1|   | 5/2002  | Grolemund et al.|        |
| 2002/0132890 | A1 | | 9/2002 | Ramesh et al.  |         |

FOREIGN PATENT DOCUMENTS

| EP | 0 104 498 | 4/1984 |
| EP | 0 505 230 | 9/1992 |
| EP | 0 572 128 | 12/1993 |
| GB | 2 227 739 | 8/1990 |
| WO | 01 18081  | 3/2001 |
| WO | 01 29106  | 4/2001 |
| WO | 03 000760 | 1/2003 |

\* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention provides a process for improving the storage stability of aqueous composite-particle dispersions and of aqueous formulations comprising them.

19 Claims, No Drawings ably suitable for
METHOD FOR IMPROVING THE STORAGE STABILITY OF COMPOSITE PARTICLE DISPERSIONS The present invention relates to a process for improving the storage stability of an aqueous dispersion of particles composed of addition polymer and finely divided inorganic solid (composite particles), wherein before, during or after the preparation of the composite particles in dispersion in the aqueous medium (aqueous composite-particle dispersion) a hydroxyl-containing alkylamino compound is added to the aqueous dispersion medium.

The present invention likewise relates to aqueous composite-particle dispersions obtained by the process of the invention and also to aqueous formulations comprising such aqueous composite-particle dispersions.

Aqueous dispersions of composite particles are general knowledge. They are fluid systems whose disperse phase in the aqueous dispersion medium comprises polymer coils consisting of a plurality of intertwined polymer chains—known as the polymer matrix—and particles composed of finely divided inorganic solid, which are in disperse distribution. The diameter of the composite particles is frequently within the range from 10 nm to 5 000 nm.

Composite particles and processes for their preparation in the form of aqueous composite-particle dispersions, and also the use thereof, are known to the skilled worker and are disclosed for example in the publications U.S. Pat. Nos. 3,544,500, 4,421,660, 4,608,401, 4,981,882, EP-A 104 498, EP-A 505 230, EP-A 572 128, GB-A 2 227 739, WO 0118081, WO 0129106, WO 03000760 and also in Long et al., Tianjin Daxue Xuebao 1991, 4, pages 10 to 15, Bourgeat-Lami et al., Die Angewandte Makromolekulare Chemie 1996, 242, pages 105 to 122, Paulke et al., Synthesis Studies of Paramagnetic Polystyrene Latex Particles in Scientific and Clinical Applications of Magnetic Carriers, pages 69 to 76, Plenum Press, New York, 1997, Armes et al., Advanced Materials 1999, 11, No. 5, pages 408 to 410.

A disadvantage of the aqueous composite-particle dispersions or of aqueous formulations comprising them is that on prolonged storage, in particular at temperatures $\geq 40°$ C., they may exhibit a viscosity increase which may even go as far as gelling. This may make it more difficult to process the aqueous composite-particle dispersions or aqueous formulations comprising them. In extreme cases the aqueous composite-particle dispersions or aqueous formulations comprising them may even become unusable for processing.

It was an object of the present invention to provide a new process for improving the storage stability of aqueous composite-particle dispersions and of aqueous formulations comprising them.

Accordingly the processes defined at the outset were found.

It is of particular advantage if the hydroxyl-containing alkylamino compound is added to the aqueous dispersion medium of the aqueous composite-particle dispersion after its preparation. It is obvious here that the signification of "after the preparation of the aqueous composite-particle dispersion" also includes the preparation of an aqueous formulation in whose preparation, besides the other formulating ingredients, an aqueous composite-particle dispersion and, separately, at least one hydroxyl-containing alkylamino compound is added.

It is favorable if the aqueous composite-particle dispersion containing a hydroxyl-containing alkylamino compound, or an aqueous formulation comprising this dispersion, has a pH $\geq 4$, $\geq 5$, $\geq 6$ or $\geq 7$ and $\leq 10$, $\leq 11$, $\leq 12$ or $\leq 13$. Frequently a pH in the range of $\geq 7$ and $\leq 11$ is set.

As hydroxyl-containing alkylamino compound it is common to use a water-soluble acyclic alkyl compound having at least 3 carbon atoms and at least one hydroxyl and one amino group. In this context it has proven advantageous if the alkylamino compound is a primary amine. The hydroxyl-containing alkylamino compound is frequently an acyclic alkyl compound having at least 3 carbon atoms which contains at least one hydroxyl group and at least one primary amino group. As will be appreciated, it is also possible to use mixtures of hydroxyl-containing amino compounds.

As acyclic alkyl compound having at least 3 carbon atoms and at least one hydroxyl and one amino group use is made, for example, of triethanolamine, diethanolamine, 2-amino-2-methylethanol, 2-amino-2,2-dimethylethanol, 3-aminopropan-1-ol, 3-aminopropan-2-ol, 3-aminopropane-1,2-diol, 2-amino-2-methylpropane-1,3-diol, 4-aminobutan-1-ol, 2-aminobutan-1-ol, 2-amino-3-methylbutan-1-ol, 5-aminopentan-1-ol, 2-(2-aminoethoxy)ethanol, 6-aminohexan-1-ol, 7-aminoheptan-1-ol, 1-aminopropan-2-ol, 3-amino-3-methylpropan-1-ol, 3-amino-2-methylpropan-1-ol, 3-amino-3-propylpropan-1-ol, 3-amino-3-phenylpropan-1-ol, 3-amino-3-cyclohexylpropan-1-ol, 3-amino-3-(cyclohexen-3-yl) propan-1-ol, 3-amino-1-vinylpropan-1-ol, 3-amino-3,3-dimethylpropan-1-ol, 3-amino-2,2-dimethylpropan-1-ol, 3-amino-1,1-dimethylpropan-1-ol, 3-amino-3,3-dimethyl-1-methylpropan-1-ol, 3-aminobutan-1-ol, 4-aminobutan-2-ol, 4-amino-2-methylbutan-1-ol, 4-amino-4,4-dimethylbutan-1-ol, 5-amino-2,2-dimethylpentan-1-ol, 5-amino-5-methyl-1,1-dimethylpentan-1-ol, 7-amino-5-methyl-1,1-dimethylhexan-1-ol or 2-(2-aminoethylamino)ethanol.

Frequently a hydroxyl-containing amino compound is used which is selected from the group consisting of 2-amino-2-methylethanol, 2-amino-2,2-dimethylethanol, 3-aminopropan-1-ol, 3-aminopropan-2-ol, 3-aminopropane-1,2-diol, 2-amino-2-methylpropane-1,3-diol, 4-aminobutan-1-ol, 2-aminobutan-1-ol, 2-amino-3-methylbutan-1-ol, 5-aminopentan-1-ol, 2-(2-aminoethoxy)ethanol, 6-aminohexan-1-ol and 7-aminoheptan-1-ol.

The amount of the hydroxyl-containing amino compound is from 0.01 to 10% by weight, frequently from 0.05 to 5% by weight and often from 0.1 to 3% by weight, based in each case on the total amount of the aqueous composite-particle dispersion. The total amount of the hydroxyl-containing amino compound can be added to the aqueous dispersion medium before the preparation of the composite particles. Additionally it is possible to add at least one portion of the hydroxyl-containing amino compound to the aqueous medium before the preparation of the composite particles and to add the remaining portion to the aqueous medium during or after the preparation of the composite particles. With advantage, however, the entirety of the hydroxyl-containing amino compound is added to the aqueous composite-particle dispersion or to the aqueous formulation comprising it. It is, however, also possible to add a portion of the hydroxyl-containing amino compound to the aqueous composite-particle dispersion and to add the remaining portion of the hydroxyl-containing amino compound to the aqueous formulation comprising the aqueous composite-particle dispersion.

The process of the invention is advantageously suitable for aqueous composite-particle dispersions of the kind prepared by a procedure which is disclosed in WO 03000760 and to which express reference is made in the context of this specification. The features of that process are that at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant, wherein a) a stable aqueous dispersion of said at least one inorganic solid is used, said dispersion having the characteristic features that at an initial solids concentration of $\geq 1\%$ by weight, based on the aqueous dispersion of said at least one inorganic solid, it still contains in dispersed form one hour after its preparation more than 90% by weight of the originally dispersed solid and its dispersed solid particles have a weight-average diameter $\leq 100$ nm, b) the dispersed particles of said at least one inorganic solid exhibit a nonzero electrophoretic mobility in an aqueous standard potassium chloride solution at a pH which corresponds to the pH of the aqueous dispersion medium before the beginning of dispersant addition, c) at least one anionic, cationic and nonionic dispersant is added to the aqueous solid-particle dispersion before the beginning of the addition of said at least one ethylenically unsaturated monomer, d) then from 0.01 to 30% by weight of the total amount of said at least one monomer are added to the aqueous solid-particle dispersion and polymerized to a conversion of at least 90%, and e) thereafter the remainder of said at least one monomer is added under polymerization conditions continuously at the rate at which it is consumed.

Finely divided inorganic solids suitable for this process are all those which form stable aqueous dispersions which at an initial solids concentration of $\geq 1\%$ by weight, based on the aqueous dispersion of said at least one inorganic solid, still contain in dispersed form one hour after their preparation without stirring or shaking more than 90% by weight of the originally dispersed solid and whose dispersed solid particles have a diameter $\leq 100$ nm and which, furthermore, exhibit a nonzero electrophoretic mobility at a pH which corresponds to the pH of the aqueous reaction medium before the beginning of dispersant addition.

The quantitative determination of the initial solids concentration and the solids concentration after one hour, and the determination of the particle diameters, take place by the method of analytical ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175). The particle diameters stated are those known as $d_{50}$ values.

The method of determining the electrophoretic mobility is known to the skilled worker (cf., e.g., R. J. Hunter, Introduction to Modern Colloid Science, Section 8.4, pages 241 to 248, Oxford University Press, Oxford, 1993, and K. Oka and K. Furusawa in Electrical Phenomena at Interfaces, Surfactant Science Series, Vol. 76, Chapter 8, pages 151 to 232, Marcel Dekker, New York, 1998). The electrophoretic mobility of the solid particles dispersed in the aqueous reaction medium is measured using a commercial electrophoresis instrument, an example being the Zetasizer 3000 from Malvern Instruments Ltd., at 20° C. and 1 bar (absolute). For this purpose the aqueous dispersion of solid particles is diluted with a pH-neutral 10 millimolar (mM) aqueous potassium chloride solution (standard potassium chloride solution) until the concentration of solid particles is from about 50 to 100 mg/l. The adjustment of the sample to the pH possessed by the aqueous reaction medium before the beginning of dispersant addition is carried out using the customary inorganic acids, such as dilute hydrochloric acid or nitric acid, for example, or bases, such as dilute sodium hydroxide solution or potassium hydroxide solution, for example. The migration of the dispersed solid particles in the electrical field is detected by means of what is known as electrophoretic light scattering (cf., e.g., B. R. Ware and W. H. Flygare, Chem. Phys. Lett. 12 (1971) 81 to 85). In this method the sign of the electrophoretic mobility is defined by the migrational direction of the dispersed solid particles; in other words, if the dispersed solid particles migrate to the cathode, their electrophoretic mobility is positive, while if they migrate to the anode it is negative.

A suitable parameter for influencing or adjusting the electrophoretic mobility of dispersed solid particles to a certain extent is the pH of the aqueous reaction medium. Protonation and, respectively, deprotonation of the dispersed solid particles alter the electrophoretic mobility positively in the acidic pH range (pH <7) and negatively in the alkaline range (pH >7). A pH range suitable for the process disclosed in WO 03000760 is that within which a free-radically initiated aqueous emulsion polymerization can be carried out. This pH range is generally from 1 to 12, frequently from 1.5 to 11, and often from 2 to 10.

The pH of the aqueous reaction medium may be adjusted using commercially customary acids, such as dilute hydrochloric, nitric or sulfuric acid, or bases, such as dilute sodium hydroxide or potassium hydroxide solution, for example. It is often advantageous to add some or all of the quantity of acid or base used for pH adjustment to the aqueous reaction medium before said at least one finely divided inorganic solid is added.

It is of advantage for the process disclosed in WO 03000760 if under the abovementioned pH conditions when the dispersed solid particles have an electrophoretic mobility having a negative sign, per 100 parts by weight of said at least one ethylenically unsaturated monomer, from 0.01 to 10 parts by weight, preferably from 0.05 to 5 parts by weight, and with particular preference from 0.1 to 3 parts by weight, of at least one cationic dispersant, from 0.01 to 100 parts by weight, preferably from 0.05 to 50 parts by weight, and with particular preference from 0.1 to 20 parts by weight, of at least one nonionic dispersant, and at least one anionic dispersant are used, the amount thereof being such that the equivalent ratio of anionic to cationic dispersant is more than 1, or when the dispersed solid particles have an electrophoretic mobility having a positive sign, per 100 parts by weight of said at least one ethylenically unsaturated monomer, from 0.01 to 10 parts by weight, preferably from 0.05 to 5 parts by weight, and with particular preference from 0.1 to 3 parts by weight, of at least one anionic dispersant, from 0.01 to 100 parts by weight, preferably from 0.05 to 50 parts by weight, and with particular preference from 0.1 to 20 parts by weight, of at least one nonionic dispersant, and at least one cationic dispersant are used, the amount thereof being such that the equivalent ratio of cationic to anionic dispersant is more than 1.

The equivalent ratio of anionic to cationic dispersant means the number of moles of the anionic dispersant used multiplied by the number of anionic groups present per mole of the anionic dispersant, divided by the number of moles of the cationic dispersant used multiplied by the number of the cationic groups present per mole of the cationic dispersant. The equivalent ratio of cationic to anionic dispersant is defined accordingly.

The total amount of said at least one anionic, cationic and nonionic dispersant used in accordance with WO 03000760 may be included in the initial charge in the aqueous dispersion of solids. It is, however, also possible to include only some of said dispersants in the initial charge in the aqueous dispersion of solids and to add the remainders continuously or discontinuously during the free-radical emulsion polymerization. It is, however, essential to the invention that, before and during the free-radically initiated emulsion polymerization, the abovementioned equivalent ratio of anionic and cationic dispersant as a function of the electrophoretic sign of the finely divided solid is maintained. When, therefore, inorganic solid particles are used which under the aforementioned pH conditions have an electrophoretic mobility having a negative sign, the equivalent ratio of anionic to cationic dispersant must be greater than 1 throughout the emulsion polymerization. Similarly, in the case of inorganic solid particles having an electrophoretic mobility having a positive sign, the equivalent ratio of cationic to anionic dispersant must be greater than 1 throughout the emulsion polymerization. It is advantageous if the equivalent ratios are $\geq 2$, $\geq 3$, $\geq 4$, $\geq 5$, $\geq 6$, $\geq 7$, or $\geq 10$, with equivalent ratios in the range between 2 and 5 being particularly advantageous.

Suitable finely divided inorganic solids which can be used for the process disclosed in WO 03000760 and generally for preparing composite particles include metals, metal compounds, such as metal oxides and metal salts, and also semimetal compounds and nonmetal compounds. Finely divided metal powders which can be used are noble metal colloids, such as palladium, silver, ruthenium, platinum, gold and rhodium, for example, and their alloys. Examples that may be mentioned of finely divided metal oxides include titanium dioxide (commercially available, for example, as Hombitec® grades from Sachtleben Chemie GmbH), zirconium(IV) oxide, tin(II) oxide, tin(IV) oxide (commercially available, for example, as Nyacol® SN grades from Akzo-Nobel), aluminum oxide (commercially available, for example, as Nyacol® AL grades from Akzo-Nobel), barium oxide, magnesium oxide, various iron oxides, such as iron(II) oxide (wuestite), iron(III) oxide (hematite) and iron(II/III) oxide (magnetite), chromium(III) oxide, antimony(III) oxide, bismuth(III) oxide, zinc oxide (commercially available, for example, as Sachtotec® grades from Sachtleben Chemie GmbH), nickel(II) oxide, nickel(III) oxide, cobalt(II) oxide, cobalt(III) oxide, copper(II) oxide, yttrium(III) oxide (commercially available, for example, as Nyacol® YTTRIA grades from Akzo-Nobel), cerium(IV) oxide (commercially available, for example, as Nyacol® CEO2 grades from Akzo-Nobel), amorphous and/or in their different crystal modifications, and also their hydroxy oxides, such as, for example, hydroxytitanium(IV) oxide, hydroxyzirconium(IV) oxide, hydroxyaluminum oxide (commercially available, for example, as Disperal® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium(III) sulfide, titanium(IV) sulfide, zirconium(IV) sulfide, antimony(III) sulfide, and bismuth(III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxyapatite [$Ca_5\{(PO_4)_3OH\}$], orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, Optigel® SH (trademark of Südchemie AG), Saponit® SKS-20 and Hektorit® SKS 21 (trademarks of Hoechst AG), and Laponite® RD and Laponite® GS (trademarks of Laporte Industries Ltd.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron(II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate, and zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Degussa AG), Levasil® (trademark of Bayer AG), Ludox® (trademark of DuPont), Nyacol® and Bindzil® (trademarks of Akzo-Nobel) and Snowtex® (trademark of Nissan Chemical Industries, Ltd.). Nonmetal compounds suitable in accordance with the invention are, for example, colloidal graphite and diamond.

Particularly suitable finely divided inorganic solids are those whose solubility in water at 20° C. and 1 bar (absolute) is $\leq 1$ g/l, preferably $\leq 0.1$ g/l and, in particular, $\leq 0.01$ g/l. Particular preference is given to compounds selected from the group consisting of silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate, zirconium(IV) orthosilicate, metasilicates, such as lithium metasilicate, calcium/magnesium metasilicate, calcium metasilicate, magnesium metasilicate, zinc metasilicate, phyllosilicates, such as sodium aluminum silicate and sodium magnesium silicate, especially in spontaneously delaminating form, such as Optigel® SH, Saponit® SKS-20 and Hektorit® SKS 21, for example, and also Laponite® RD and Laponite® GS, iron(II) oxide, iron (III) oxide, iron(II/III) oxide, titanium dioxide, hydroxylapatite, zinc oxide, and zinc sulfide. Particular preference is given to silicon compounds, such as pyrogenic and/or colloidal silica, silicon dioxide sols and/or phyllosilicates. Frequently the silicon compounds have an electrophoretic mobility having a negative sign.

In the processes of the invention it is also possible to use with advantage the commercially available compounds of the Aerosil®, Levasil®, Ludox®, Nyacol® and Bindzil® grades (silicon dioxide), Disperal® grades (hydroxyaluminum oxide), Nyacol® AL grades (aluminum oxide), Hombitec® grades (titanium dioxide), Nyacol® SN grades (tin(IV) oxide), Nyacol® YTTRIA grades (yttrium(III) oxide), Nyacol® CEO2 grades (cerium(IV) oxide) and Sachtotec® grades (zinc oxide).

The finely divided inorganic solids which can be used to prepare the composite particles have particles which, dispersed in the aqueous reaction medium, have a particle diameter of $\leq 100$ nm. Finely divided inorganic solids used successfully are those whose dispersed particles have a diameter $>0$ nm but $\leq 90$ nm, $\leq 80$ nm, $\leq 70$ nm, $\leq 60$ nm, $\leq 50$ nm, $\leq 40$ nm, $\leq 30$ nm, $\leq 20$ nm or $\leq 10$ nm and all values in between. With advantage, finely divided inorganic solids are used which have a particle diameter $\leq 50$ nm. The particle diameters are determined by the AUC method.

The obtainability of finely divided solids is known in principle to the skilled worker and they are obtained, for example, by precipitation reactions or chemical reactions in the gas phase (cf. E. Matijevic, Chem. Mater. 5 (1993) 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994, and R. J. Hunter in Foundations of Colloid Science, Vol. I, pages 10 to 17, Clarendon Press, Oxford, 1991).

The stable dispersion of solids is often prepared directly during synthesis of the finely divided inorganic solids in aqueous medium or else by dispersing the finely divided inorganic solid into the aqueous medium. Depending on the way in which said solids are prepared, this is done either directly, in the case, for example, of precipitated or pyrogenic silicon dioxide, aluminum oxide, etc., or by using appropriate auxiliary devices, such as dispersers or ultrasound sonotrodes, for example.

Advantageously for the preparation of the aqueous composite-particle dispersions suitable finely divided inorganic solids are those whose aqueous solids dispersion, at an initial solids concentration of $\geq 1\%$ by weight, based on the aqueous dispersion of said solid, still contains in dispersed form one hour after its preparation or by stirring or shaking up the sedimented solids, without further stirring or shaking, more than 90% by weight of the originally dispersed solid and whose dispersed solid particles have a diameter $\leq 100$ mm. Initial solids concentrations $\leq 60\%$ by weight are customary. With advantage, however, it is also possible to use initial solids concentrations $\leq 55\%$ by weight, $\leq 50\%$ by weight, $\leq 45\%$ by weight, $\leq 40\%$ by weight, $\leq 35\%$ by weight, $\leq 30\%$ by weight, $\leq 25\%$ by weight, $\leq 20\%$ by weight, $\leq 15\%$ by weight, $\leq 10\%$ by weight and $\geq 2\%$ by weight, $\geq 3\%$ by weight, $\geq 4\%$ by weight or $\geq 5\%$ by weight, based in each case on the aqueous dispersion of the finely divided inorganic solid, and all values in between. In preparing aqueous composite-particle dispersions, per 100 parts by weight of said at least one ethylenically unsaturated monomer, use is made frequently of from 1 to 1000, generally from 5 to 300, and often from 10 to 200 parts by weight of said at least one finely divided inorganic solid.

In preparing the aqueous composite-particle dispersions of WO 03000760, dispersants used include those which maintain not only the finely divided inorganic solid particles but also the monomer droplets and the resulting composite particles in disperse distribution in the aqueous phase and so ensure the stability of the aqueous dispersions of composite particles that are produced. Suitable dispersants include both the protective colloids commonly used to carry out free-radical aqueous emulsion polymerizations, and emulsifiers.

An exhaustive description of suitable protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420.

Examples of suitable neutral protective colloids are polyvinyl alcohols, polyalkylene glycols, cellulose derivatives, starch derivatives and gelatin derivatives.

Suitable anionic protective colloids, i.e., protective colloids whose dispersive component has at least one negative electrical charge, are for example polyacrylic acids and polymethacrylic acids and their alkali metal salts, copolymers containing acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene.

Suitable cationic protective colloids, i.e., protective colloids whose dispersive component has at least one positive electrical charge, are, for example, the N-protonated and/or N-alkylated derivatives of homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides.

It is of course also possible to use mixtures of emulsifiers and/or protective colloids. As dispersants it is common to use exclusively emulsifiers, whose relative molecular weights, unlike those of the protective colloids, are usually below 1500. Where mixtures of surface-active substances are used the individual components must of course be compatible with one another, which in case of doubt can be checked by means of a few preliminary experiments. An overview of suitable emulsifiers is given in Houben-Weyl, Methoden der organischen Chemie, Volume XIV/1, Makromolekulare Stoffe [Macromolecular compounds], Georg-Thieme-Verlag, Stuttgart, 1961, pages 192 to 208.

Customary nonionic emulsifiers are for example ethoxylated mono-, di- and tri-alkylphenols (EO units: 3 to 50, alkyl: $C_4$ to $C_{12}$) and ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11), and the Lutensol® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the general formula I

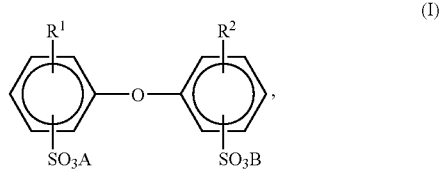

in which $R^1$ and $R^2$ are hydrogens or $C_4$ to $C_{24}$ alkyl but are not both simultaneously hydrogens and A and B can be alkali metal ions and/or ammonium ions. In the general formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. A and B are preferably sodium, potassium or ammonium, particular preference being given to sodium. Particularly advantageous compounds I are those in which A and B are sodium, $R^1$ is a branched alkyl radical of 12 carbons, and $R^2$ is a hydrogen or $R^1$. Frequently, use is made of technical-grade mixtures containing a fraction of from 50 to 90% by weight of the monoalkylated product; for example, Dowfax® 2A1 (trademark of Dow Chemical Company). The compounds I are widely known, from U.S. Pat. No. 4,269,749, for example, and are obtainable commercially.

Suitable cation-active emulsifiers are generally $C_{16}$-$C_{18}$ alkyl-, aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides and acetates of the various paraffinic acid 2-(N,N,N-trimethylammonium ethyl esters, N-cetylpyridinium chloride, N-laurylpyridinium sulfate, and also N-cetyl-N,N,N-trimethylammonium bromide, N-dodecyl-N,N,N-trimethylammonium bromide, N-octyl-N,N,N-trimethylammonium bromide, N,N-distearyldimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

Frequently the aqueous composite-particle dispersions are prepared using between 0.1 to 10% by weight, often 0.5 to 7.0% by weight and frequently 1.0 to 5.0% by weight of dispersant(s), based in each case on the total amount of aqueous composite-particle dispersion. Preference is given to using emulsifiers.

Monomers which are ethylenically unsaturated and suitable for preparing the composite particles include, in particular, monomers which are easy to polymerize free-radically, such as, for example, ethylene, vinylaromatic monomers, such as styrene, α-methylstyrene, o-chlorostyrene or vinyltoluenes, esters of vinyl alcohol and $C_1$-$C_{18}$ monocarboxylic acids, such as vinyl acetate, vinyl propionate, vinyl n-butyrate, vinyl laurate and vinyl stearate, esters of preferably $C_3$-$C_6$ α,β-monoethylenically unsaturated mono- and dicarboxylic acids, such as especially acrylic acid, methacrylic acid, maleic acid, fumaric acid and itaconic acid, with generally $C_1$-$C_{12}$, preferably $C_1$-$C_8$ and, in particular, $C_1$-$C_4$ alkanols, such as, in particular, methyl, ethyl, n-butyl, isobutyl and 2-ethylhexyl acrylate and methacrylate, dimethyl maleate or di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers, which, based on the overall amount of the monomers to be polymerized by the process of the invention, normally account for a proportion of ≧50%, ≧80% or ≧90% by weight. As a general rule, these monomers are only of moderate to poor solubility in water under standard conditions [20° C., 1 bar (absolute)].

Monomers which customarily increase the internal strength of the films of the polymer matrix normally contain at least one epoxy, hydroxyl, N-methylol or carbonyl group or at least two nonconjugated ethylenically unsaturated double bonds. Examples thereof are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are the methacrylic and acrylic $C_1$-$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the abovementioned monomers are copolymerized in amounts of up to 5% by weight, based on the total amount of the monomers to be polymerized.

Optionally, it is also possible to use monomers containing siloxane groups, such as the vinyltrialkoxysilanes, e.g., vinyltrimethoxysilane, alkylvinyldialkoxysilanes, acryloyloxyalkyltrialkoxysilanes, or methacryloyloxyalkyltrialkoxysilanes, such as acryloyloxyethyltrimethoxysilane, methacryloyloxyethyltrimethoxysilane, acryloyloxypropyltrimethoxysilane or methacryloyloxypropyltrimethoxysilane, for example. These monomers are used in amounts of up to 2% by weight, frequently from 0.01 to 1% by weight, and often from 0.05 to 0.5% by weight, based in each case on the total monomer amount.

Besides these, it is possible additionally to use as monomers those ethylenically unsaturated monomers A which contain either at least one acid group and/or its corresponding anion or those ethylenically unsaturated monomers B which contain at least one amino, amido, ureido or N-heterocyclic group and/or the N-protonated or N-alkylated ammonium derivatives thereof. Based on the total monomer amount, the amount of monomers A or monomers B, respectively, is up to 10% by weight, often from 0.1 to 7% by weight, and frequently from 0.2 to 5% by weight.

Monomers A used are ethylenically unsaturated monomers containing at least one acid group. The acid group may, for example, be a carboxylic, sulfonic, sulfuric, phosphoric and/or phosphonic acid group. Examples of monomers A are acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also phosphoric monoesters of n-hydroxyalkyl acrylates and n-hydroxyalkyl methacrylates, such as phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate, for example. In accordance with the invention, however, it is also possible to use the ammonium and alkali metal salts of the aforementioned ethylenically unsaturated monomers containing at least one acid group. Particularly preferred alkali metals are sodium and potassium. Examples of such compounds are the ammonium, sodium, and potassium salts of acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also the mono- and di-ammonium, -sodium and -potassium salts of the phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate.

Preference is given to using acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid.

As monomers B, use is made of ethylenically unsaturated monomers which contain at least one amino, amido, ureido or N-heterocyclic group and/or the N-protonated or N-alkylated ammonium derivatives thereof.

Examples of monomers B which contain at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methylamino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-(N-isopropylamino)ethyl acrylate, 2-(N-isopropylamino)ethyl methacrylate, 2-(N-tert-butylamino)ethyl acrylate, 2-(N-tert-butylamino)ethyl methacrylate (available commercially, for example, as Norsocryl® TBAEMA from Elf Atochem), 2-(N,N-dimethylamino)ethyl acrylate (available commercially, for example, as Norsocryl® ADAME from Elf Atochem), 2-(N,N-dimethylamino)ethyl methacrylate (available commercially, for example, as Norsocryl® MADAME from Elf Atochem), 2-(N,N-diethylamino)ethyl acrylate, 2-(N,N-diethylamino)ethyl methacrylate, 2-(N,N-di-n-propylamino)ethyl acrylate, 2-(N,N-di-n-propylamino)ethyl methacrylate, 2-(N,N-diisopropylamino)ethyl acrylate, 2-(N,N-diisopropylamino)ethyl methacrylate, 3-(N-methylamino)propyl acrylate, 3-(N-methylamino)propyl methacrylate, 3-(N-ethylamino)propyl acrylate, 3-(N-ethylamino)propyl methacrylate, 3-(N-n-propylamino)propyl acrylate, 3-(N-n-propylamino)propyl methacrylate, 3-(N-isopropylamino)propyl acrylate, 3-(N-isopropylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-diisopropylamino)propyl acrylate and 3-(N,N-diisopropylamino)propyl methacrylate.

Examples of monomers B which contain at least one amido group are acrylamide, methacrylamide, N-methylacrylamide, N-methylmethacrylamide, N-ethylacrylamide, N-ethylmethacrylamide, N-n-propylacrylamide, N-n-propylmethacrylamide, N-isopropylacrylamide, N-isopropylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-diisopropylacrylamide, N,N-diisopropylmethacrylamide, N,N-di-n-butylacrylamide, N,N-di-n-butylmethacrylamide, N-(3-N',N'-dimethylaminopropyl)methacrylamide, diacetoneacrylamide, N,N'-methylenebisacrylamide, N-(diphenylmethyl)acrylamide, N-cyclohexylacrylamide, and also N-vinylpyrrolidone and N-vinylcaprolactam.

Examples of monomers B which contain at least one ureido group are N,N'-divinylethyleneurea and 2-(1-imidazolin-2-onyl)ethyl methacrylate (available commercially, for example, as Norsocryl® 100 from Elf Atochem).

Examples of monomers B which contain at least one N-heterocyclic group are 2-vinylpyridine, 4-vinylpyridine, 1-vinylimidazole, 2-vinylimidazole, and N-vinylcarbazole.

Preference is given to using the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate.

Depending on the pH of the aqueous reaction medium, it is also possible for some or all of the aforementioned nitrogen-containing monomers B to be present in the N-protonated quaternary ammonium form.

Examples that may be mentioned of monomers B which have a quaternary alkylammonium structure on the nitrogen include 2-(N,N,N-trimethylammonium)ethyl acrylate chloride (available commercially, for example, as Norsocryl® ADAMQUAT MC 80 from Elf Atochem), 2-(N,N,N-trimethylammonium)ethyl methacrylate chloride (available commercially, for example, as Norsocryl® MADQUAT MC 75 from Elf Atochem), 2-(N-methyl-N,N-diethylammonium)ethyl acrylate chloride, 2-(N-methyl-N,N-diethylammonium)ethyl methacrylate chloride, 2-(N-methyl-N,N-dipropylammonium)ethyl acrylate chloride, 2-(N-methyl-N,N-dipropylammonium)ethyl methacrylate, 2-(N-benzyl-N,N-dimethylammonium)ethyl acrylate chloride (available commercially, for example, as Norsocryl® ADAMQUAT BZ 80 from Elf Atochem), 2-(N-benzyl-N,N-dimethylammonium)ethyl methacrylate chloride (available commercially, for example, as Norsocryl® MADQUAT BZ 75 from Elf Atochem), 2-(N-benzyl-N,N-diethylammonium)ethyl acrylate chloride, 2-(N-benzyl-N,N-diethylammonium)ethyl methacrylate chloride, 2-(N-benzyl-N,N-dipropylammonium)ethyl acrylate chloride, 2-(N-benzyl-N,N-dipropylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium)propyl acrylate chloride, 3-(N-methyl-N,N-diethylammonium)propyl methacrylate chloride, 3-(N-methyl-N,N-dipropylammonium)propyl acrylate chloride, 3-(N-methyl-N,N-dipropylammonium)propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethylammonium)propyl methacrylate chloride, 3-(N-benzyl-N,N-dipropylammonium)propyl acrylate chloride, and 3-(N-benzyl-N,N-dipropylammonium)propyl methacrylate chloride. It is of course also possible to use the corresponding bromides and sulfates instead of the chlorides named.

Preference is given to using 2-(N,N,N-trimethylammonium)ethyl acrylate chloride, 2-(N,N,N-trimethylammonium)ethyl methacrylate chloride, 2-(N-benzyl-N,N-dimethylammonium)ethyl acrylate chloride, and 2-(N-benzyl-N,N-dimethylammonium)ethyl methacrylate chloride.

It is of course also possible to use mixtures of the aforementioned ethylenically unsaturated monomers.

Initiators suitable for preparing the aqueous composite-particle dispersion by free-radical polymerization are all those polymerization initiators capable of triggering a free-radical aqueous emulsion polymerization. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, or else organic peroxides, such as alkyl hydroperoxides, examples being tert-butyl, p-menthyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis(2,4-dimethylvaleronitrile) and 2,2'-azobis(amidinopropyl) dihydrochloride (AIBA, corresponding to the commercial product V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts, of aliphatic sulfinic acids, and alkali metal hydrogen sulfides, e.g., potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical polymerization initiator used, based on the total amount of the monomer mixture, is from 0.1 to 5% by weight.

Suitable reaction temperatures for the free-radical aqueous polymerization reaction in the presence of the finely divided inorganic solid embrace the entire range from 0 to 170° C. In general, the temperatures used are from 50 to 120° C., frequently from 60 to 110° C. and often ≧70 to 100° C. The free-radical aqueous emulsion polymerization can be conducted at a pressure less than, equal to or greater than 1 bar (absolute), so that the polymerization temperature may exceed 100° C. and can be up to 170° C. Highly volatile monomers such as ethylene, butadiene or vinyl chloride are preferably polymerized under increased pressure. In this case the pressure can adopt values of 1.2, 1.5, 2, 5, 10 or 15 bar or higher. When emulsion polymerizations are conducted under subatmospheric pressure, pressures of 950 mbar, frequently 900 mbar and often 850 mbar (absolute) are established. The free-radical aqueous polymerization is advantageously conducted at 1 bar (absolute) under an inert gas atmosphere, such as under nitrogen or argon, for example.

The aqueous reaction medium may in principle also include, to a minority extent, water-soluble organic solvents, such as methanol, ethanol, isopropanol, butanols, pentanols, and also acetone, etc., for example. Preferably, however, the polymerization reaction is conducted in the absence of such solvents.

Besides the abovementioned components, it is also possible, optionally, in the processes for the preparation of the aqueous composite-particle dispersion to use free-radical chain-transfer compounds in order to reduce or control the molecular weight of the polymers obtainable by the polymerization. Suitable compounds of this type include, essentially, aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in Polymer Handbook, $3^{rd}$ Edition, 1989, J. Brandrup and E. H. Immergut, John Wiley & Sons, Section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane, or vinylcyclohexane or hydrocarbons having readily abstractable hydrogen atoms, such as toluene, for example. It is, however, also possible to use mixtures of mutually compatible, abovementioned free-radical chain-transfer compounds. The total amount of the free-radical chain-transfer compounds used optionally, based on the total amount of the monomers to be polymerized, is generally ≦5% by weight, often ≦3% by weight, and frequently ≦1% by weight.

The aqueous dispersions of composite particles that are used in accordance with the invention normally have a total solids content of from 1 to 70% by weight, frequently from 5 to 65% by weight, and often from 10 to 60% by weight.

The composite particles used in accordance with the invention generally possess particle diameters of >10 and ≦1000 nm, frequently ≦500 nm and often ≦250 nm. These particle diameters are also determined by the AUC method. The values stated are those known as $d_{50}$ values.

The composite particles useful in accordance with the invention can have different structures. The composite particles can comprise one or more of the finely divided solid particles. The finely divided solid particles may be completely enveloped by the polymer matrix. Alternatively, it is possible for some of the finely divided solid particles to be enveloped by the polymer matrix while others are arranged on the surface of the polymer matrix. It is of course also possible for a majority of the finely divided solid particles to be bound on the surface of the polymer matrix.

Frequently use is made in particular of composite-particle dispersions whose composite particles are synthesized from addition polymers which are filmable and whose minimum film formation temperature is ≦150° C., preferably ≦100° C. and more preferably ≦50° C. Since at below 0° C. it is no longer possible to measure the minimum film formation temperature, the lower limit of the minimum film formation temperature can be indicated only by means of the glass transition temperature. The glass transition temperatures should not be below −60° C., preferably −30° C. The minimum film formation temperature is determined in accordance with DIN 53 787 or ISO 2115 and the glass transition temperature by DIN 53 765 (Differential Scanning Calorimetry, 20 K/min, midpoint measurement).

The aqueous composite-particle dispersions obtainable by the process of the invention have a markedly higher storage stability than the aqueous composite-particle dispersions which do not include a hydroxyl-containing alkylamino compound.

The dispersions of composite particles of the invention are especially suitable for preparing aqueous formulations, and also as raw materials for preparing adhesives, such as pressure-sensitive adhesives, building adhesives or industrial adhesives, for example, binders, such as for paper coating, for example, emulsion paints, or for printing inks and print varnishes for printing plastics films, for producing nonwovens, and for producing protective coats and water vapor barriers, such as in priming, for example. In addition, the dispersions of composite particles obtainable by the process of the invention can be used to modify cement formulations and mortar formulations. The composite particles obtainable by the process of the invention can also be used, in principle, in medical diagnostics and in other medical applications (cf., e.g., K. Mosbach and L. Andersson, Nature 270 (1977) 259 to 261; P. L. Kronick, Science 200 (1978) 1074 to 1076; and U.S. Pat. No. 4,157,323). With advantage the composite-particle dispersions of the invention are suitable for preparing aqueous coating compositions, such as emulsion paints, inks or primers, for example.

It is significant that the aqueous formulations which comprise an aqueous composite-particle dispersion and also at least one hydroxyl-containing alkylamino compound likewise have a distinctly increased storage stability and so can be processed reliably even after a prolonged period of time.

EXAMPLES

I. Preparation of an Aqueous Composite-Particle Dispersion

A 2 l four-necked flask equipped with a reflux condenser, a thermometer, a mechanical stirrer and a metering device was charged under nitrogen atmosphere at from 20 to 25° C. (room temperature) and 1 bar (absolute) and with stirring (200 revolutions per minute) with 416.6 g of Nyacol® 2040 and then with a mixture of 2.5 g of methacrylic acid and 12 g of a 10% strength by weight aqueous solution of sodium hydroxide, added over the course of 5 minutes. Thereafter, a mixture of 10.4 g of a 20% strength by weight aqueous solution of the nonionic surfactant Lutensol® AT18 (brand name of BASF AG, $C_{16}C_{18}$ fatty alcohol ethoxylate having on average 18 ethylene oxide units) and 108.5 g of deionized water were added over the course of 15 minutes to the stirred reaction mixture. Thereafter, 0.83 g of N-cetyl-N,N,N-trimethylammonium bromide (CTAB) in solution in 200 g of deionized water was metered in to the reaction mixture over 60 minutes. The reaction mixture was then heated to a reaction temperature of 80° C.

Prepared in parallel were feed stream 1, a monomer mixture consisting of 117.5 g of methyl methacrylate, 130 g of n-butyl acrylate and 0.5 g of methacryloyloxypropyltrimethoxysilane, and feed stream 2, an initiator solution consisting of 2.5 g of sodium peroxodisulfate, 7 g of a 10% strength by weight aqueous solution of sodium hydroxide, and 200 g of deionized water.

Subsequently, 21.1 g of feed stream 1 and 57.1 g of feed stream 2 were added to the reaction mixture, stirred at reaction temperature, from two separate feed lines over 5 minutes. The reaction mixture was then stirred at reaction temperature for one hour. Thereafter, 0.92 g of a 45% strength by weight aqueous solution of Dowfax® 2A1 was added to the reaction mixture. The remainders of feed streams 1 and 2 were then metered continuously into the reaction mixture over the course of 2 hours, beginning simultaneously. Thereafter, the reaction mixture was stirred at reaction temperature for one hour more and then cooled to room temperature.

The aqueous composite-particle dispersion thus obtained had a solids content of 35.1% by weight, based on the total weight of the aqueous composite-particle dispersion.

II. Performance Testing a) Storage Stability of the Aqueous Composite-Particle Dispersion To check the storage stability, in each case 50 g of aforementioned aqueous composite-particle dispersion was admixed with 0.175 g (corresponding to 0.5% by weight, based on the solids content of the aqueous composite-particle dispersion) and with 0.35 g (corresponding to 1.0% by weight, based on the solids content of the aqueous composite-particle dispersion) of a 50% strength by weight aqueous solution of the hydroxyl-containing alkylamino compound, the ingredients were mixed homogeneously and the mixture was then stored in closed 100 ml sample bottles at 70° C. and examined visually each day for gelling (sharp rise in viscosity, "honeylike" viscosity). Table 1 lists the gel times obtained for the different alkylamino compounds.

TABLE 1

Gel times of aqueous composite-particle dispersion stabilized with hydroxyl-containing alkylamino compound, in days

| Hydroxyl-containing alkylamino compound | Amount added | |
|---|---|---|
| | 0.5% by weight | 1.0% by weight |
| None | 6 | 6 |
| Triethanolamine | 7 | 9 |
| Diethanolamine | 7 | 9 |
| 2-Amino-2,2-dimethylethanol | 14 | 23 |
| 3-Aminopropan-1-ol | 17 | 26 |
| 1-Aminopropan-2-ol | 12 | 19 |
| 3-Aminopropane-1,2-diol | 11 | 14 |
| 2-Amino-2-methylpropane-1,2-diol | 7 | 10 |
| 4-Aminobutan-1-ol | 17 | 34 |
| 2-Aminobutan-1-ol | 10 | 18 |
| 2-Amino-3-methylbutan-1-ol | 13 | 17 |

TABLE 1-continued

Gel times of aqueous composite-particle dispersion stabilized with hydroxyl-containing alkylamino compound, in days

| Hydroxyl-containing | Amount added | |
|---|---|---|
| alkylamino compound | 0.5% by weight | 1.0% by weight |
| 5-Aminopentan-1-ol | 17 | 38 |
| 2-(2-Aminoethoxy)ethanol | 9 | 11 | b) Storage Stability of an Aqueous Coating Formulation

The ingredients indicated below (amounts in g) were used to prepare the two pigment pastes P1 and P2 at room temperature with stirring using a disc stirrer at 1000 revolutions per minute. The individual ingredients of the blend were added in the order stated.

| Ingredient | P1 | P2 |
|---|---|---|
| deionized water | 140 | 148 |
| biocide (Acticid ® MBS, Thor) | 2 | 2 |
| thickener (Collacral ® DS 6256, BASF AG) | 3 | 3 |
| 25% strength by weight aqueous solution of ammonia | 0.5 | 0.5 |
| 2-amino-2,2-dimethylethanol | 8 | — |
| dispersant (Pigmentverteiler ® MD 20, BASF AG) | 10 | 10 |
| dispersant (Collacral ® LR 8954, BASF AG) | 10 | 10 |
| defoamer (Tego ® LA-E 511, Tego Chemie Service GmbH) | 2 | 2 |
| pigment (titanium dioxide, Kronos ® 2190, Kronos Titan GmbH) | 120 | 120 |
| filler (Omycarb ® 5GU, Omya GmbH) | 40 | 40 |
| filler (Finntalc ® M15, Omya GmbH) | 20 | 20 |

After the end of the addition, stirring of the two pigment pastes was continued for 20 minutes at 1000 revolutions per minute. Thereafter each of the two pigment pastes was admixed with further stirring with in each case 1 g of defoamer (Byk® 022, Byk-Chemie GmbH), 20 g of a thickener solution (Collacral® LR 8990, BASF AG) diluted to a solids content of 5% by weight and also 597 g of the above-described aqueous composite-particle dispersion and 27 g of deionized water. The coating compositions thus obtained, which were aqueous, were stirred at 500 revolutions per minute for 20 minutes. Prior to the further tests, the coating compositions were rested at room temperature for 24 hours. Within the aforementioned rest phase the coating composition P2 underwent gelling.

To test for storage stability the viscosity of the aqueous coating composition P1 was determined at 23° C. using an ICI cone and plate viscometer (along the lines of ASTM D4287) and a Brookfield KU 1 viscometer (along the lines of ASTM D562) before and after a 14-day storage period at 50° C. Virtually no change in viscosity at all could be found.

We claim:

1. A process for improving the storage stability of an aqueous dispersion of particles comprising addition polymer and finely divided inorganic solid (composite particles), the process comprising:
adding a hydroxyl-containing alkylamino compound to an aqueous dispersion medium before, during or after preparation of the composite particles in dispersion in the aqueous medium (aqueous composite-particle dispersion), wherein the composite particles have a diameter of more than 10 nm to 1000 nm.

2. The process according to claim 1, wherein the hydroxyl-containing alkylamino compound is added to the aqueous dispersion medium of the aqueous composite-particle dispersion after its preparation.

3. The process according to claim 1, wherein the aqueous composite-particle dispersion containing a hydroxyl-containing alkylamino compound has a pH $\geq 7$ and $\leq 11$.

4. The process according to claim 1, wherein the hydroxyl-containing alkylamino compound is an acyclic alkyl compound having at least 3 carbon atoms and at least one hydroxyl and one amino group.

5. The process according to claim 1, wherein the alkylamino compound is a primary amine.

6. The process according to claim 1, wherein the hydroxyl-containing alkylamino compound is an acyclic alkyl compound having at least 3 carbon atoms which contains at least one hydroxyl group and at least one primary amino group.

7. The process according to claim 1, wherein the amount of the hydroxyl-containing amino compound is from 0.01 to 10% by weight, based on the total amount of the aqueous composite-particle dispersion.

8. The process according to claim 1, wherein the aqueous composite-particle dispersion has been prepared by a process in which at least one ethylenically unsaturated monomer is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant, where
   a) a stable aqueous dispersion of said at least one inorganic solid is used, said dispersion having the characteristic features that at an initial solids concentration of $\geq 1\%$ by weight, based on the aqueous dispersion of said at least one inorganic solid, it still contains in dispersed form one hour after its preparation more than 90% by weight of the originally dispersed solid and its dispersed solid particles have a weight-average diameter $\leq 100$ nm,
   b) the dispersed particles of said at least one inorganic solid exhibit a nonzero electrophoretic mobility in an aqueous standard potassium chloride solution at a pH which corresponds to the pH of the aqueous dispersion medium before the beginning of dispersant addition,
   c) at least one anionic, cationic and nonionic dispersant is added to the aqueous solid-particle dispersion before the beginning of the addition of said at least one ethylenically unsaturated monomer,
   d) then from 0.01 to 30% by weight of the total amount of said at least one monomer are added to the aqueous solid-particle dispersion and polymerized to a conversion of at least 90%, and
   e) thereafter the remainder of said at least one monomer is added under polymerization conditions continuously at the rate at which it is consumed.

9. The process according to claim 8, wherein the finely divided inorganic solid is a silicon compound.

10. The process according to claim 9, wherein the finely divided inorganic solid is pyrogenic and/or colloidal silica and/or a phyllosilicate.

11. The process according to claim 1, wherein the hydroxyl-containing amino compound is a compound selected from the group consisting of 2-amino-2-methylethanol, 2-amino-2,2-dimethylethanol, 3-aminopropan-1-ol, 3-aminopropan-2-ol, 3-aminopropane-1,2-diol, 2-amino-2-methylpropane-1,3-diol, 4-aminobutan-1-ol, 2-aminobutan- 1-ol, 2-amino-3-methylbutan- 1-ol, 5-aminopentan- 1-ol, 2-(2-aminoethoxy)ethanol, 6-aminohexan-1-ol and 7-aminoheptan-1-ol.

12. An aqueous composite-particle dispersion obtained by the process according to claim 1.

13. An aqueous coating composition comprising an aqueous composite-particle dispersion according to claim 12.

14. A method of using an aqueous composite-particle dispersion according to claim 12 for preparing aqueous coating compositions.

15. The process according to claim 1, wherein the composite particles have a diameter of more than 10 nm to 500 nm.

16. The process according to claim 1, wherein the composite particles have a diameter of more than 10 nm to 250 nm.

17. The process according to claim 1, wherein the hydroxyl-containing alkylamino compound is added in an amount of 0.01 to 10% by weight, based on the total amount of the aqueous composite-particle dispersion.

18. The process according to claim 1, wherein the hydroxyl-containing alkylamino compound is added in an amount of 0.05 to 5% by weight, based on the total amount of the aqueous composite-particle dispersion.

19. The process according to claim 1, wherein the hydroxyl-containing alkylamino compound is added in an amount of 0.1 to 3% by weight, based on the total amount of the aqueous composite-particle dispersion.

* * * * *